United States Patent [19]
Wilsch et al.

[11] 4,368,960
[45] Jan. 18, 1983

[54] CAMERA WITH DEVICE FOR ILLUMINATING A MARK ON A FILM EDGE

[75] Inventors: Herbert Wilsch; Johann Zanner, both of Unterhaching, Fed. Rep. of Germany

[73] Assignee: Agfa-Gevaert AG, Leverkusen, Fed. Rep. of Germany

[21] Appl. No.: 289,518

[22] Filed: Aug. 3, 1981

[30] Foreign Application Priority Data

Aug. 14, 1980 [DE] Fed. Rep. of Germany ....... 3030874

[51] Int. Cl.³ .............................................. G03B 21/50
[52] U.S. Cl. ...................................... 352/92; 352/169; 352/221
[58] Field of Search .................. 352/92, 236, 169, 221

[56] References Cited

U.S. PATENT DOCUMENTS

| | | | |
|---|---|---|---|
| 2,516,718 | 7/1950 | Oriol | 352/92 |
| 3,301,628 | 1/1967 | Hellmund | 352/92 |
| 3,788,736 | 1/1974 | Oulevay et al. | 352/92 |

*Primary Examiner*—Monroe H. Hayes
*Attorney, Agent, or Firm*—Michael J. Striker

[57] ABSTRACT

A camera has a film transport device for gradually advancing a one-edge perforated light sensitive film over a picture gate with a support face, and a device for illuminating a mark on the film and including an opening which is formed in the support face at a side of a not perforated edge of the film and forms first edges on the support face and a second edge which faces toward a picture gate and lies deeper than the first edges.

4 Claims, 4 Drawing Figures

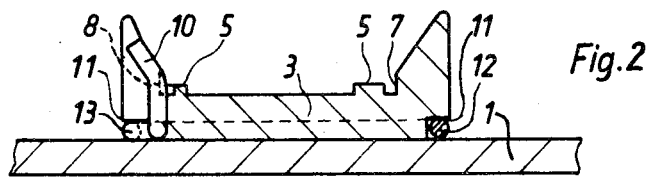
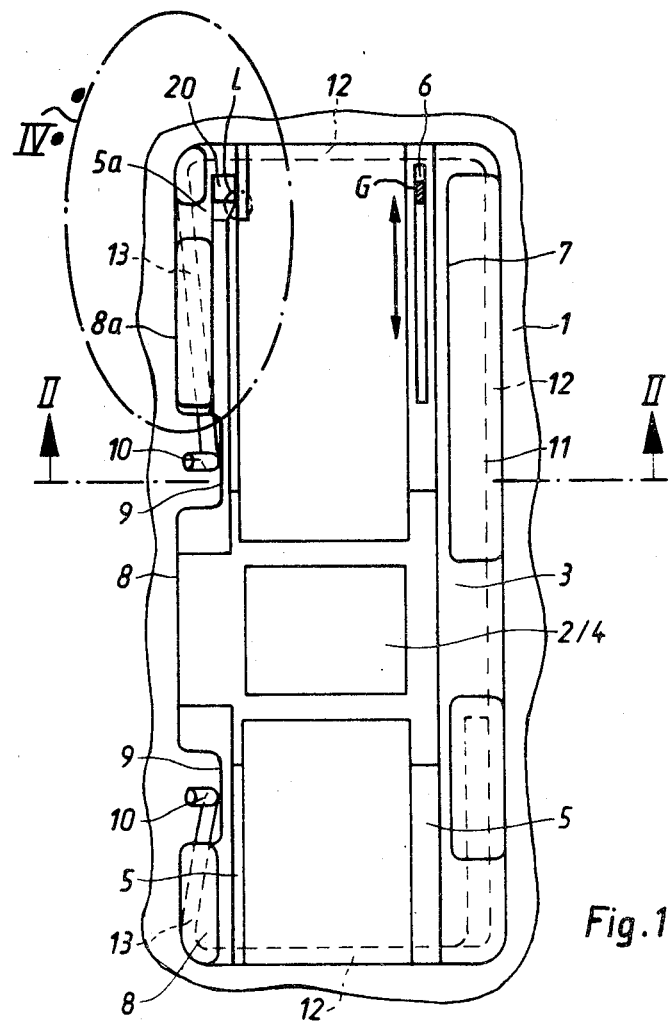

CAMERA WITH DEVICE FOR ILLUMINATING A MARK ON A FILM EDGE

BACKGROUND OF THE INVENTION

The present invention relates to a camera with a film transport device for gradual advancement of a one-edge perforated light sensitive film over a picture gate and with a device for illuminating a mark on one edge of the film.

Cameras of the above-mentioned general type are known in the art. For example, one of such cameras is disclosed in the German Offenlegungsschrift 2,746,036. The marks serve for recognition of individual frames to be projected in immovable position. The arrangement for applying the mark includes an illumination station which is located after the picture gate on the perforation side as considered in direction of the film running. The marks are located in front of the respective frames on the film.

It has been recognized that the construction of the respective camera must satisfy different requirements with the consideration of the problems caused by the illumination and the projection. A particular difficulty is that the marking device must not be dirtied. Dirt can accumulate in the camera for example by the claw or by the film wear caused by film positioning means. Furthermore, the mark must be limited as great and accurate as possible so as to be easily and reliably detected by the respective detectors in the projection device. They must be not visible and projected over in any case.

As disclosed in the simultaneously filed application P 3030875.9 (CW 2434.0 PP/MP), the dirtying can be avoided in a construction in which the illumination device, particularly an opening with the associated light source, is arranged in front of the film transport device parts which cause wear, as considered in film running direction. It is possible in this construction to widen the film guide in such a manner that the illumination opening is edged in the film support plates and thereby sharp marks can be produced.

However, in this construction there can be not avoided that the dirt or dust settle in the illumination opening.

SUMMARY OF THE INVENTION

Accordingly, it is an object of the present invention to provide a camera which avoids the disadvantages of the prior art.

More particularly, it is an object of the present invention to provide a camera which guarantees a self-cleaning from dirt or dust.

In keeping with these objects and with others which will become apparent hereinafter, one feature of the present invention resides, briefly stated, in a camera in which an illumination device has an opening provided in a support face for a not perforated film edge, and an edge of the opening facing toward a picture gate is deeper than edges at the support face.

In accordance with another especially advantageous feature of the present invention, the above-mentioned deeper edge lowers in a wedge-like manner to a dirt guiding passage which leads outwardly. In such a construction, greater dirt particles can also be removed in reliable way.

Still a further advantageous feature of the present invention is that the dirt guiding passage in the region of the face which lowers in the wedge-like manner. This provides for the possibility that the film support immediately after the illumination opening can be widened to the normal dimension and thereby the entire film support face is subjected to only insignificant changes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing inventive parts of a narrow film camera in accordance with the present invention;

FIG. 2 is a view showing a section of the camera, taken along the line 2—2 in FIG. 1;

DESCRIPTION OF A PREFERRED EMBODIMENT

Figure 3:
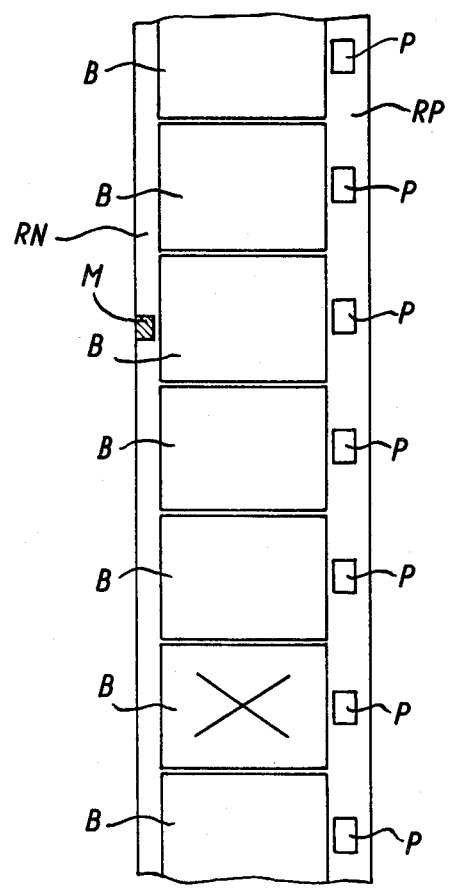
FIG. 3 is a view of a film marked in accordance with the present invention.

FIGS. 1 and 2 show an end side support plate 1 of a narrow film camera in accordance with the present invention. It has a picture gate opening 2 and carries a film channel plate 3 which is also provided with a picture gate opening 4. Not shown rotary shutter and claw mechanism, as well as a camera objective, are located under the support plate 1 as considered in the direction of looking at the FIGS. 1 and 2.

The film channel plate 3 has in film transport direction at both sides of the picture gate opening 2, four guides 5 serving as film support faces. They are arranged exactly opposite the objective and adjusted so as to form the film channel proper. Moreover, corresponding slots are formed in the film channel plate 3 and the support plate 1 for passage of a film transport claw G.

Guides 7, 8 and 8a serve for lateral film guidance, whereas the guides 8 and 8a have two recesses at their one longitudinal side. The recesses 9 serve for engagement of two lateral film pressing springs 10 and are arranged substantially symmetrical to the transverse line of the picture gate openings 2 and 4. The lateral film pressing springs 10 provide for the fact that the not shown film and the film gate is held in abutment against the lateral guide 7 and thereby is exactly adjusted, since the distance of the guides 7, 8 on the grounds of a disturbance free film transport, must be somewhat greater than the film width.

A groove 11 is provided in the film channel plate 3 under the film channel 5 for receiving the film pressing springs 10. The groove 11 is considerably deeper at the side of the recesses 9 than at the three other sides of the film channel plate 3. The film pressing springs 10 are formed of a spring wire 12 which is so bent that it lies at the longitudinal side extending through the guide 7 and at both small sides of the film channel plate 3, exactly and closely in the groove 11. A free arm 13 of the spring wire 12 lies in the recesses 9 at the side of the film channel plate 3, which extends through the recesses 9. The free arm 13 protrudes at the corners of the film channel plate 3 up to the outer edge of the groove 11 and is there inclined inwardly so as to bend into the recesses 9 and thereby to be prestressed. The ends of the arms 13 abutting against the recesses 9 and thereby against the film edge are bent upwardly normal to the film channel 5 and thereby forms lateral pressing springs proper which act onto the film edge. The above described construction of the film plate is known from the German Gebrauchsmuster 7,819,727.

For applying a mark in accordance with the present invention the film support guide 5 is widened in the upper region 5a which is opposite to an end 6 of the movement region of the claw G. It has an opening 20 in this region having a square outlet at the side of the film. A light source L is located behind the opening 20. The light source is formed, for example, as a luminouscent diode and emits light in a predetermined time during the immovable period of the film. Thereby, because of the square outlet of the opening, a square mark M is exposed on the film, as can be seen from FIG. 3.

Figure 4:
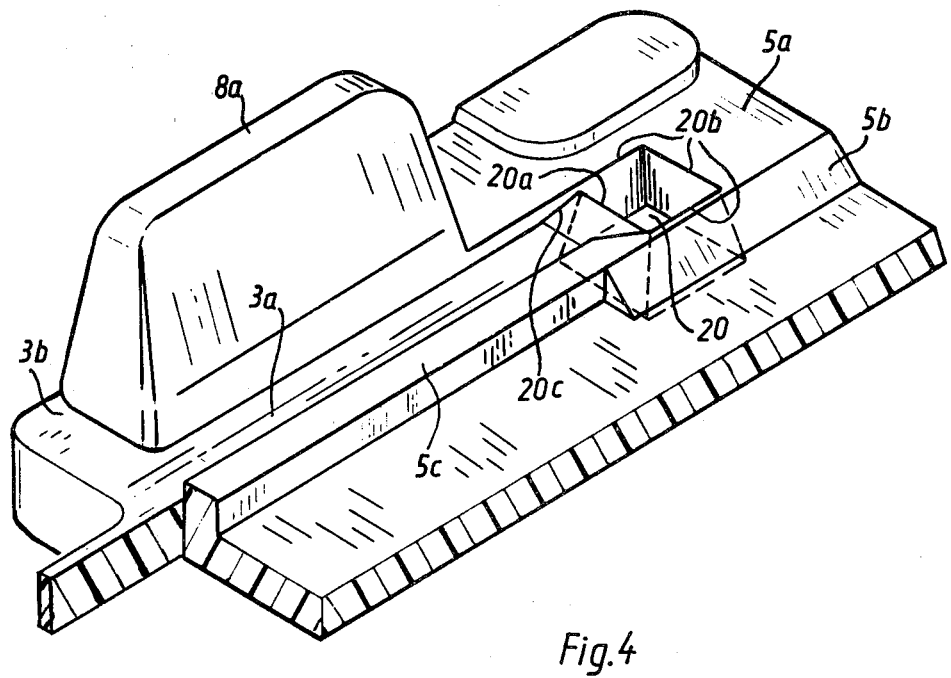
FIG. 4 is an enlarged perspective view of the section of FIG. 1.

As shown in FIG. 4, an edge 20a of the opening 20, which faces toward the picture gate, is locted below the level of the film support face 5a and transits into a face which lowers in a wedge-like manner. The lowering face opens into a dirt guiding passage 3a which leads over a face 3b outwardly. The dirt guiding passage 3a is so narrow that the film guiding face 5c has a conventional normal width.

When the film runs on the film support faces 5a, 5c which takes with it dirt particles which eventually accumulate in the opening 20 and transport them via the passage 3a outwardly.

The widening of the film support guide 5 in the region 5a does not act in a damaging manner onto the film. It forms, however, an edging of the opening 20 standing up to the film support face. Thereby, overshining of the illumination mark M in the frame region B is avoided. Because of this reliable separation of the mark and frame, the mark, as can be seen from FIG. 3, can be relatively wide which leads for increase of the recognizability during the projection.

FIG. 3 shows a film which has a mark M, is perforated at its one perforation edge RP with perforation openings P, has individual frames B, wherein the mark M is provided on an edge RN which does not have perforations. The picture located in the frame space is identified by reference "X". As can be seen from this Figure, the mark M is located in the middle of the frame height opposite to the perforation P.

It will be understood that each of the elements described above, or two or more together, may also find a useful application in other types of constructions differing from the types described above.

While the invention has been illustrated and described as embodied in a camera with a film transport device and a mark illumination device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A camera comprising film transport means for gradually advancing a one edge perforated light sensitive film over a picture gate, said transport means having a support face; and means for illuminating a mark on the film, said illuminating means including an opening formed in said support face at a side of a not perforated edge of the film, said opening forming first edges on said support face and a second edge which faces toward the picture gate and lies deeper than said first edges of said opening.

2. A camera as defined in claim 1, wherein said second edge of said opening is an inclined edge.

3. A camera as defined in claim 2 and further comprising means forming dirt guiding passage which leads outwardly, said second edge of said opening lowering in a wedge-like manner into said dirt guiding passage.

4. A camera as defined in claim 3, wherein said second edge of said opening transmits into said dirt guiding passage via a face which lowers in the wedge-like manner, said guiding passage narrowing in the region of said lowering face.

* * * * *